United States Patent
Wada et al.

(10) Patent No.: US 9,887,611 B2
(45) Date of Patent: Feb. 6, 2018

(54) LINEAR MOTOR

(71) Applicant: SUMITOMO HEAVY INDUSTRIES, LTD., Tokyo (JP)

(72) Inventors: Kotaro Wada, Yokosuka (JP); Doutaro Usui, Yokosuka (JP); Takashi Ikeda, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 43 days.

(21) Appl. No.: 14/831,002

(22) Filed: Aug. 20, 2015

(65) Prior Publication Data

US 2015/0357896 A1    Dec. 10, 2015

Related U.S. Application Data

(63) Continuation of application No. PCT/JP2014/000819, filed on Feb. 18, 2014.

(30) Foreign Application Priority Data

Feb. 27, 2013   (JP) .................... 2013-037749
Mar. 1, 2013    (JP) .................... 2013-040530

(51) Int. Cl.
    *H02K 41/03*  (2006.01)
    *H02K 1/17*   (2006.01)
    *H02K 7/09*   (2006.01)

(52) U.S. Cl.
    CPC ............ *H02K 41/031* (2013.01); *H02K 1/17* (2013.01); *H02K 7/09* (2013.01)

(58) Field of Classification Search
    CPC ........... H02K 1/17; H02K 41/031; H02K 7/09
    USPC .................................................. 310/12.24
    See application file for complete search history.

(56) References Cited

U.S. PATENT DOCUMENTS

| | | | | |
|---|---|---|---|---|
| 5,333,553 A | * | 8/1994 | Matsui | H02K 41/031 104/290 |
| 5,661,350 A | * | 8/1997 | Lucidarme | H02K 41/033 310/12.24 |
| 6,573,623 B2 | * | 6/2003 | Tsuboi | H02K 41/031 310/12.19 |

(Continued)

FOREIGN PATENT DOCUMENTS

| | | |
|---|---|---|
| JP | 2001-008431 A | 1/2001 |
| JP | 2001-217183 A | 8/2001 |
| JP | 2003-032996 A | 1/2003 |

(Continued)

OTHER PUBLICATIONS

Translation of foreign document JP 2006304438 (Year: 2006).*
Translation of foreign document JP 2003333823 (Year: 2003).*

*Primary Examiner* — Alex W Mok
(74) *Attorney, Agent, or Firm* — Claire Zopf

(57) ABSTRACT

A linear motor includes a mover movable in a first direction and a stator. A yoke includes a pair of back yokes provided opposite to each other so as to sandwich the mover in a second direction perpendicular to the first direction. A plurality of field magnets are provided on an inner lateral surface of each of the pair of back yokes in the first direction. A pair of auxiliary magnets are provided (i) on end lateral surfaces of the back yokes and (ii) in the vicinity of the field magnets at the extreme end provided in the back yoke. A magnetic member is provided to surround the pair of auxiliary magnets.

16 Claims, 9 Drawing Sheets

(56) References Cited

U.S. PATENT DOCUMENTS

| | | | | |
|---|---|---|---|---|
| 6,750,570 B1 * | 6/2004 | Grehant | ............... | H02K 41/031 |
| | | | | 310/12.26 |
| 7,608,949 B2 * | 10/2009 | Busch | .................... | E05F 15/60 |
| | | | | 310/14 |

FOREIGN PATENT DOCUMENTS

| | | | |
|---|---|---|---|
| JP | 2003-116262 A | 4/2003 |
| JP | 2003-333823 A | 11/2003 |
| JP | 2004-222419 A | 8/2004 |
| JP | 2006-304438 A | 11/2006 |
| JP | 2007-116815 A | 5/2007 |

\* cited by examiner

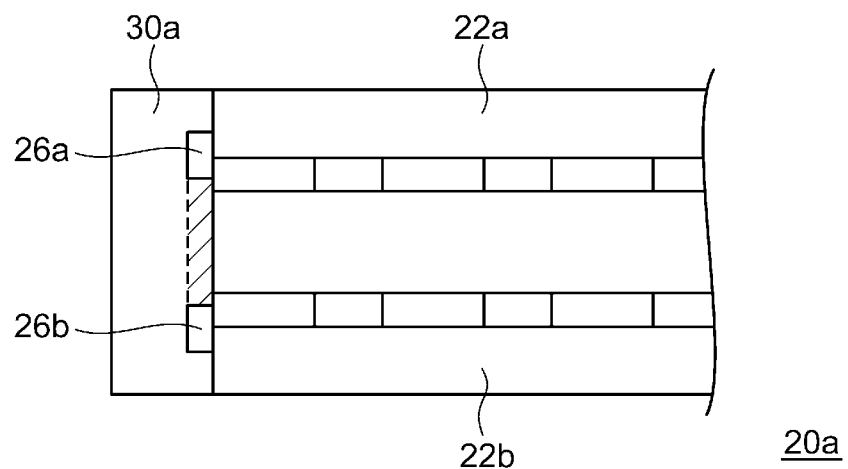
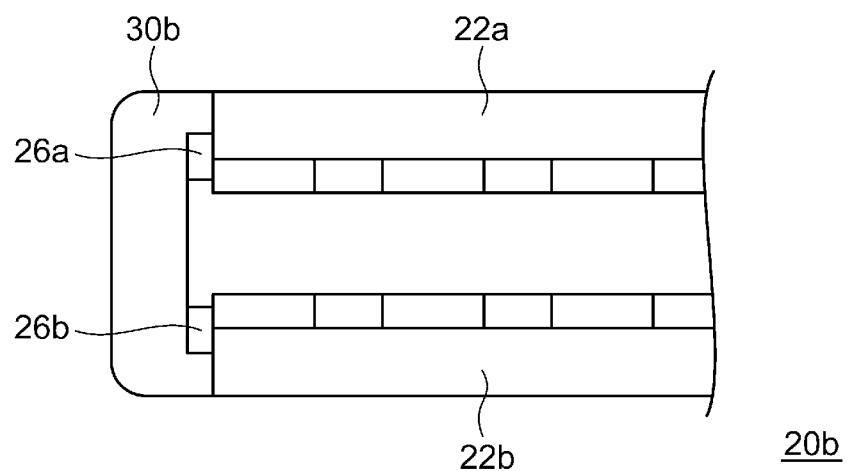
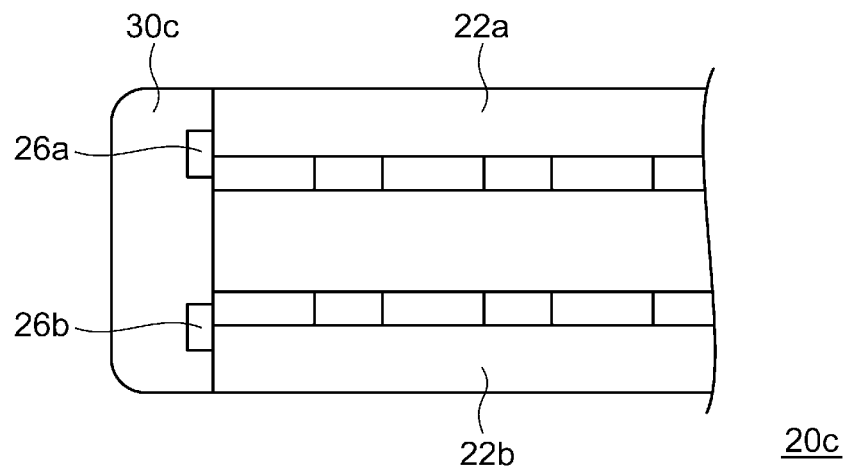

40

40

LINEAR MOTOR

This application is a continuation under 35 U.S.C. § 120 of PCT/JP2014/000819, filed Feb. 18, 2014, which is incorporated herein reference, and which claimed priority to Japanese Application No. 2013-037749, filed Feb. 27, 2013 and Japanese Application No. 2013-040530, filed Mar. 1, 2013. The present application likewise claims priority under 35 U.S.C. § 119 to Japanese Application No. 2013-037749, filed Feb. 27, 2013 and No. 2013-040530, filed Mar. 1, 2013, the entire contents of which are also incorporated herein by reference.

BACKGROUND OF THE INVENTION

1. Field of the Invention

The present invention relates to a linear motor.

2. Description of the Related Art

Linear motors are used to convert electric energy into linear motion. In some applications of linear motors, it is desired to reduce the stray magnetic field as much as possible. JP2006-304438 discloses a technology of reducing the stray magnetic field by arranging a magnetic plate at the end of the yoke of the stator.

FIG. 1 shows a structure of the stator of the related-art linear motor. In the related-art linear motor, a stator 20*r* is provided with a pair of yokes (back yokes) 22*a* and 22*b* provided opposite to each other, and a plurality of field magnets 24 provided on an inner lateral surface S1 of each of the back yokes 22*a* and 22*b* in a direction of movement of a mover (not shown). A magnetic plate 30*r* is provided in contact with an end lateral surface S2 of each of the back yokes 22*a* and 22*b*.

The magnetic permeability of the magnetic plate 30*r* is larger than the magnetic permeability of air. A magnetic flux, by its very nature, extends in a route where the magnetic permeability is high. Therefore, by mounting the U-shaped magnetic plate 30*r* on the end lateral surfaces of the pair of back yokes, a relatively larger amount of magnetic flux passes through the space occupied by the magnetic plate as compared to a case where the magnetic plate 30*r* is not provided. In other words, the magnetic flux is converged in the space so that spreading of the magnetic flux into another space is relatively mitigated.

However, we studied the linear motor having the stator 20*r* of FIG. 1 and recognized the following issues.

In order to reduce the stray magnetic field, it is necessary to build the stator 20*r* of FIG. 1 such that the magnetic resistance does not change discontinuously between the back yoke 22 and the magnetic plate 30*r*. In reality, however, a gap 31 existing between the back yoke 22 and the magnetic plate 30*r* causes the magnetic resistance to change discontinuously between the back yoke 22 and the magnetic plate 30*r*.

For example, the gap 31 is caused by (i) the lack of precision in mechanically working the back yoke 22 or the magnetic plate 30*r*, or an error in assembly (error ascribed to dimensional tolerance or geometric tolerance). The magnetic resistance of air is larger than the magnetic resistance of the back yoke 22 and the magnetic plate 30*r*, which are magnetic bodies.

The gap 31 may be (ii) a surface treatment layer coating the surface of the back yoke 22 or the magnetic plate 30*r*. Since the back yoke 22 and the magnetic plate 30*r* are magnetic bodies, or, more specifically, an iron, a non-magnetic coating may be applied to to prevent rust. The magnetic resistance of a non-magnetic surface treatment layer is larger than the magnetic resistance of the back yoke 22 and the magnetic plate 30*r*.

Since the gap 31, characterized by a larger magnetic resistance, is located between the back yoke 22 and the magnetic plate 30*r*, the magnetic flux leaking from the back yoke 22 is not completely absorbed by the magnetic plate 30*r* but leaks outside, as indicated by arrows $\Phi 1$ and $\Phi 2$ in FIG. 1.

SUMMARY OF THE INVENTION

Embodiments of the present invention address a need to provide a linear motor in which the stray magnetic field is reduced.

1. An embodiment of the present invention relates to a linear motor. A linear motor includes a mover movable in a first direction and a stator. One of the stator and the mover includes: a pair of back yokes provided opposite to each other so as to sandwich the other of the stator and the mover in a second direction perpendicular to the first direction; a plurality of field magnets arranged on an inner lateral surface of each of the pair of back yokes in the first direction; a magnetic member that magnetically couples respective corresponding ends of the pair of back yokes; and at least one auxiliary magnet each provided inside the magnetic member or in contact with the magnetic member.

According to this embodiment, the auxiliary magnets allow the magnetic flux to be drawn into the magnetic member and returned to the yoke even in the presence of a gap between the magnetic member and the back yokes. Accordingly, the stray magnetic flux is reduced.

The auxiliary magnet may be arranged to generate a magnetic flux in a direction aligned with a target magnetic flux that should be formed by the plurality of field magnets and the magnetic member.

One of said at least one auxiliary magnet may be arranged in contact with both an end lateral surface of one of the pair of back yokes and with the field magnet at the extreme end provided along said one of the pair of back yokes. Another of said at least one auxiliary magnet may be arranged in contact with both an end lateral surface of the other of the pair of back yokes and with the field magnet at the extreme end provided along said other of the pair of back yokes.

This allows the magnetic flux to be drawn into the magnetic member more properly. It also reduces repulsive force between the auxiliary magnet and the field magnet at the extreme end.

The magnetic member may include a first portion parallel to the first direction and in contact with an end lateral surface of one of the pair of back yokes, a second portion parallel to the first direction and in contact with an end lateral surface of the other of the pair of back yokes, and a third portion parallel to the second direction and connecting the first portion and the second portion, and a cross section of the magnetic member viewed in a third direction perpendicular to the first and second directions may be substantially U-shaped.

The at least one auxiliary magnet may be embedded inside the magnetic member.

One of the at least one auxiliary magnet may be arranged inside the first portion or the second portion in an orientation in which the magnetic flux is generated in the first direction.

One of the at least one auxiliary magnet may be arranged inside the third portion in an orientation in which the magnetic flux is generated in the second direction.

One of said at least one auxiliary magnet may be arranged inside a corner of the magnetic member in an orientation in which the magnetic flux is generated in a diagonal direction.

2. Another embodiment of the present invention also relates to a linear motor. A linear motor includes a mover movable in a first direction and a stator. One of the stator and the mover includes: a pair of back yokes provided opposite to each other so as to sandwich the other of the stator and the mover in a second direction perpendicular to the first direction; a plurality of field magnets arranged on an inner lateral surface of each of the pair of back yokes in the first direction; and a magnetic member that magnetically couples neighboring respective corresponding ends of the pair of back yokes. The magnetic member is configured to cover at least an end lateral surface of each of the pair of back yokes perpendicular to the first direction and a portion of an outer lateral surface of each of the pair of back yokes.

According to this embodiment, a gap that may be created between the magnetic member and the end lateral surface of the back yoke is covered by the magnetic member. Therefore, the magnetic flux leaking from the gap can be drawn into the magnetic member and returned to the yoke so that the stray magnetic field can be reduced.

The magnetic member may include a first portion and a second portion. The first portion may be in contact with an end lateral surface of each of the pair of back yokes at respective ends of a first lateral surface of the first portion, a second lateral surface of the first portion perpendicular to the first lateral surface may be substantially flush with an outer lateral surface of one of the pair of back yokes, and a third lateral surface of the first portion opposite to the second lateral surface may be substantially flush with an outer lateral surface of the other of the pair of back yokes. A second portion may include a recess that covers a second and third lateral surfaces of the first portion, a fourth lateral surface parallel to the first lateral surface of the first portion, and an end of an outer lateral surface of each of the pair of back yokes.

An end of an outer lateral surface of each of the pair of back yokes is formed with a groove, and the magnetic member is formed such that it can be fitted into the groove.

The corners of the magnetic member may be rounded.

The first and second portions may be formed so as to be integrated and inseparable. The first and second portions may be formed so as to be discrete.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 4A-4C are top views showing variations of the stator;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

First Example

Figure 2A:
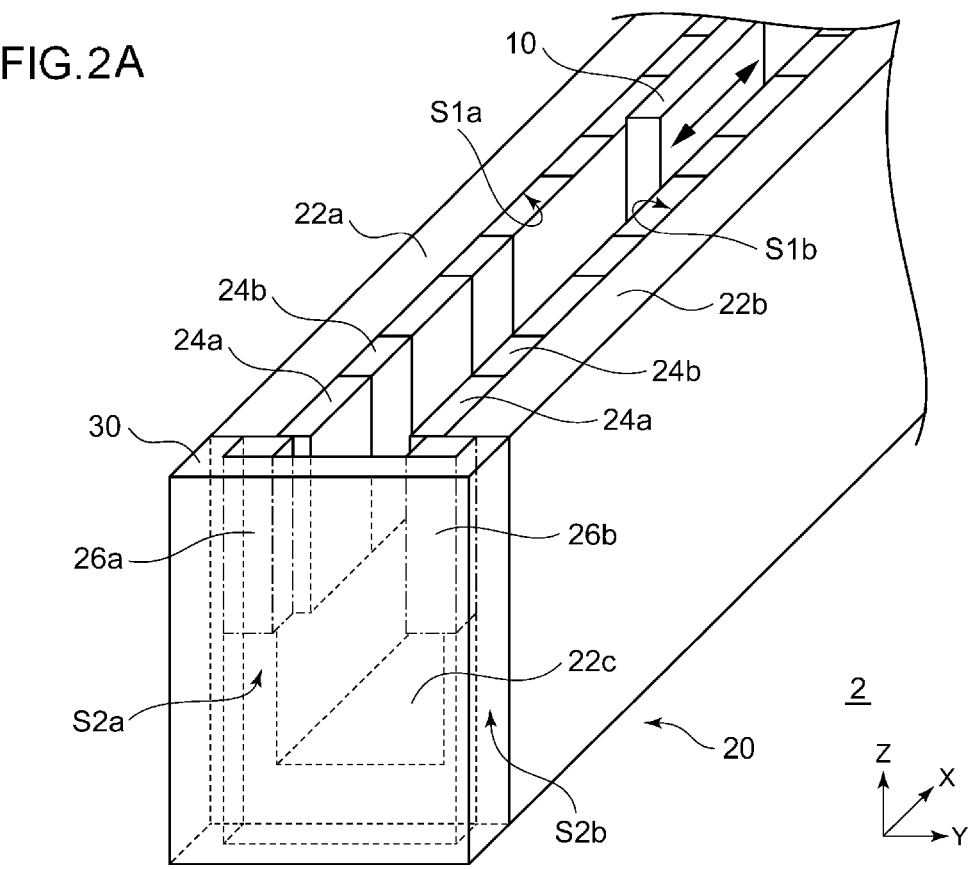
FIGS. 2A and 2B show a linear motor according to the first example.
Figure 2B:
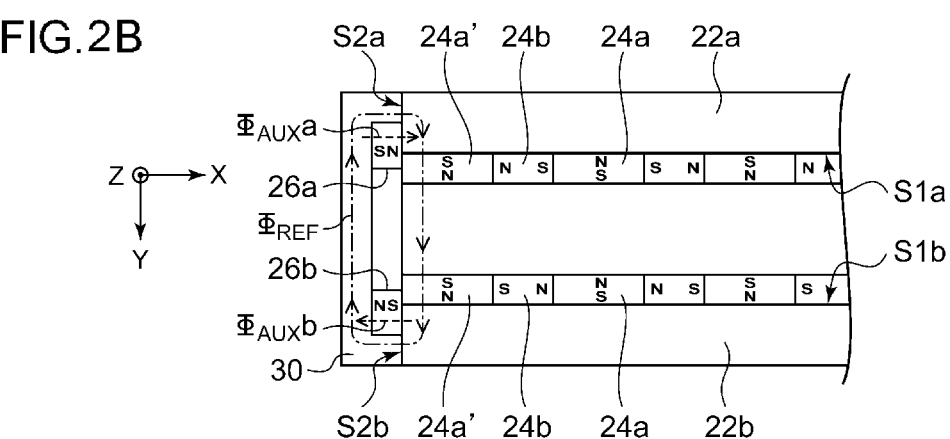

FIGS. 2A and 2B show a linear motor according to the first example. FIG. 2A is a perspective view of a linear motor 2 and FIG. 2B is a top view of a stator 20. FIG. 2B shows only one end of the stator 20, but the other end is configured similarly.

The linear motor 2 is provided with a mover 10 movable in the first direction (X axis) and a stator 20. The mover 10 is provided with an armature winding (coil) (not shown). The first example can be employed either in a coreless linear motor or in a cored linear motor. The structure of the mover 10 is not specifically limited.

The stator 20 is provided with a yoke 22, a plurality of field magnets 24, at least one (two in this example) auxiliary magnets 26a and 26b, and a magnetic member 30.

The yoke 22 is provided with a pair of back yokes 22a and 22b provided opposite to each other so as to sandwich the mover 10 in the second direction (Y direction) perpendicular to the first direction (X direction). The pair of back yokes 22a and 22b are formed so as to be integrated with a bottom yoke 22c.

An inner lateral surface S1a and S1b of each of the pair of back yokes 22a and 22b is provided with a plurality of field magnets 24 arranged in the first direction. In this example, the plurality of field magnets 24 are arranged in a Halbach array in which a magnet 24a of the main polarity orientation and a magnet 24b of the auxiliary polarity orientation are alternately provided.

The magnetic member 30 magnetically couples respective corresponding ends S2 of the pair of back yokes 22a and 22b.

The auxiliary magnets 26a and 26b are provided in contact with the magnetic member 30. More specifically, the auxiliary magnet 26a is provided in an area sandwiched by the magnetic member 30 and the yoke 22a and the auxiliary magnet 26b is provided in an area sandwiched by the magnetic member 30 and the yoke 22b.

The plurality of field magnets 24 and the magnetic member 30 form a magnetic flux. FIG. 2B indicates the target magnetic flux that should be formed by the plurality of field magnets 24 and the magnetic member 30 by $\Phi_{REF}$. The auxiliary magnets 26a and 26b are arranged to generate the magnetic flux $\Phi_{AUX}a$ and $\Phi_{AUX}b$ in directions aligned with the flow of the target magnetic flux $\Phi_{REF}$.

In this example, the auxiliary magnet 26a is provided in the vicinity of an end lateral surface S2a of the back yoke 22a perpendicular to the first direction (X axis) and generates the magnetic flux $\Phi_{AUX}a$ in a direction perpendicular to the end lateral surface S2a. Similarly, the auxiliary magnet 26b is provided in the vicinity of an end lateral surface S2b of the back yoke 22b and generates the magnetic flux $\Phi_{AUX}b$ in a direction perpendicular to the end lateral surface S2b.

In this example, the magnetic member 30 is provided to surround the auxiliary magnets 26a and 26b. More specifically, the magnetic member 30 has a U-shape and the auxiliary magnets 26a and 26b are provided at the inner corners.

Preferably, the auxiliary magnet 26a is arranged in contact with both the end lateral surface S2a of the corresponding back yoke 22a and with a field magnet 24a' at the extreme end. Similarly, the auxiliary magnet 26b is arranged in contact with both the end lateral surface S2b of the back yoke 22b and with a corresponding field magnet 24a' at the extreme end.

Described above is the configuration of the linear motor 2.

Figure 3A:
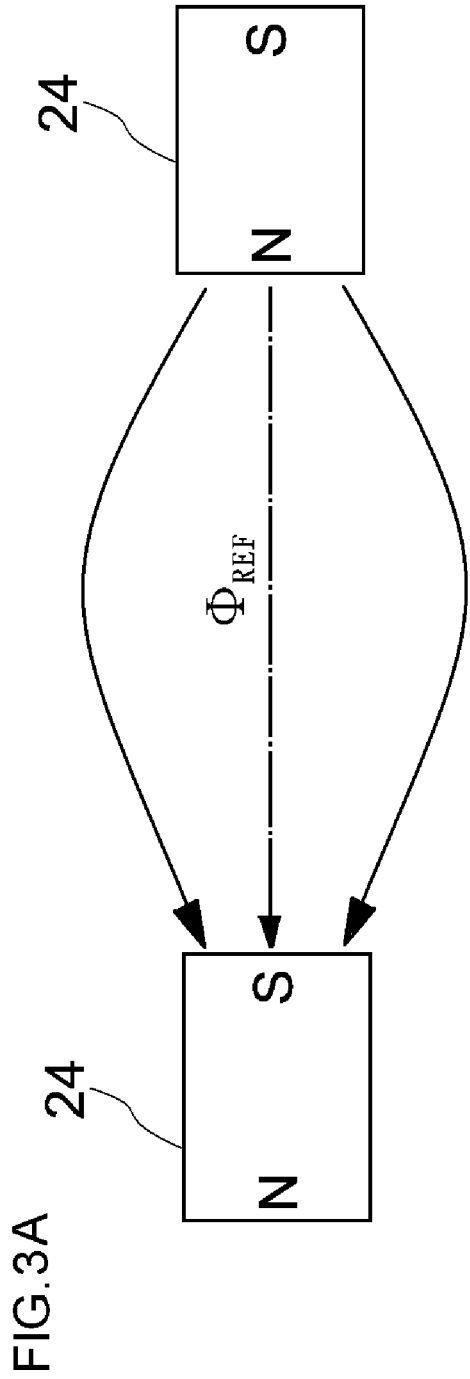
FIGS. 3A and 3B illustrate the principle of the linear motor according to the first example.
Figure 3B:
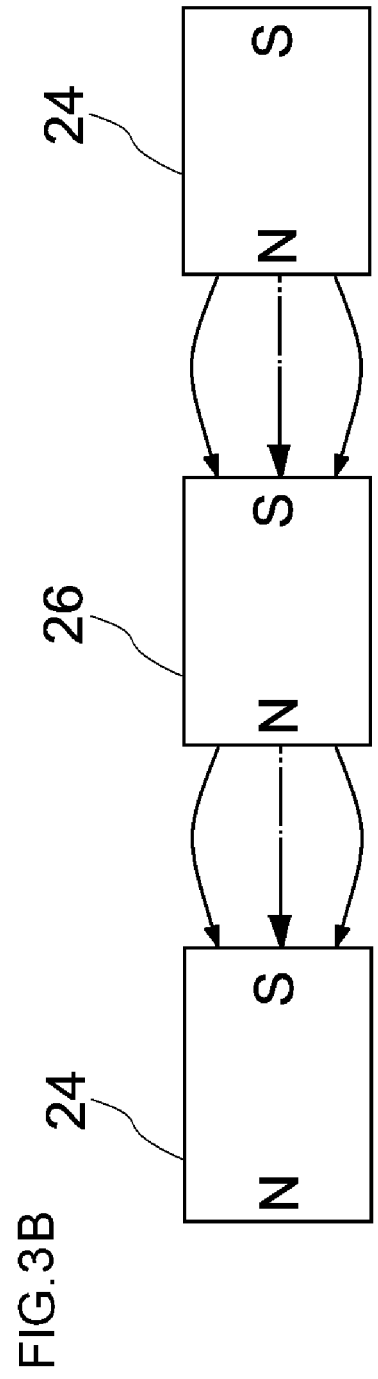

FIGS. 3A and 3B illustrate the principle of the linear motor according to the first example. FIG. 3A schematically shows the flow of magnetic flux in the absence of the auxiliary magnets 26, and FIG. 3B schematically shows the flow of magnetic flux in the presence of the auxiliary magnets 26. FIG. 3A indicates the ideal flow (target direction) of magnetic flux that should be formed by the field magnets 24 by $\Phi_{REF}$. In the absence of the auxiliary magnet 26, the magnetic flux actually formed is deviated from $\Phi_{REF}$, the target direction, as shown in FIG. 3A.

In contrast, by providing the auxiliary magnet 26 as shown in FIG. 3B, the auxiliary magnet 26 provides a convergent point of the magnetic flux. The magnetic flux (stray magnetic field) that extends in a direction away from the target direction $\Phi_{REF}$ in FIG. 3A is drawn toward the target direction $\Phi_{REF}$.

According to the linear motor 2, the auxiliary magnets 26a and 26b provide convergent points of the magnetic flux so that, even in the presence of a gap between the magnetic member 30 and the end lateral surface S2 of the yoke 22, the magnetic flux that tends to leak outside from the gap can be drawn into the magnetic member 30 so that the stray magnetic field can be reduced.

Figure 1:
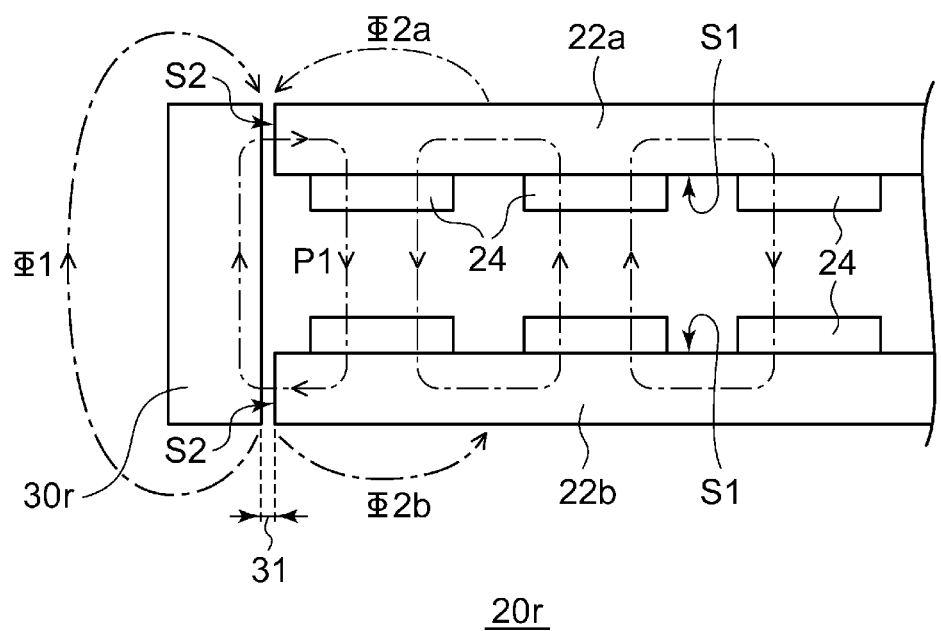
FIG. 1 shows a structure of the stator of the related-art linear motor.

Assuming that the stray magnetic field on the order of mT (millitesla) is present in the linear motor of FIG. 1, the stray magnetic field can be reduced to the order of µT (microtesla) by employing the structure of the linear motor 2 according to the first example.

A description will now be given of a variation of the linear motor 2 according to the first example.

Variation 1.1

FIGS. 4A-4C are top views showing variations of the stator 20. In the variations of FIGS. 4A-4C, the shape of the magnetic member 30 is different from that of FIG. 2. In the stator 20a of FIG. 4A, a magnetic member 30a is also located in an area (with a hatching) sandwiched by the auxiliary magnets 26a and 26b. In other words, the magnetic member 30a forms a cuboid, with the auxiliary magnets 26a and 26b embedded therein.

A magnetic member 30b of the stator 20b of FIG. 4B is produced by rounding the corners of the magnetic member 30 of FIG. 2B. A magnetic member 30c of a stator 20c of FIG. 4C is a combination of the variations of FIGS. 4A and 4B.

The same advantage as that of the linear motor 2 of FIGS. 2A and 2B can be obtained in these variations.

Variation 1.2

Figure 5A:
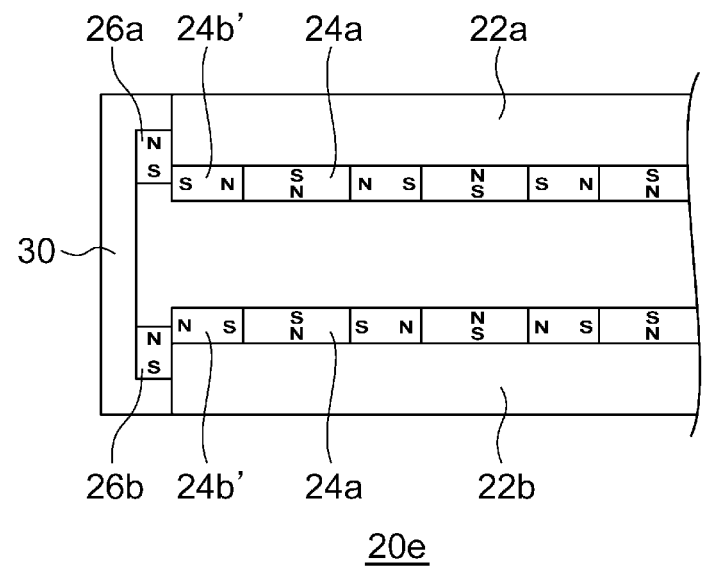
FIGS. 5A and 5B are top views showing variations of the stator.
Figure 5B:
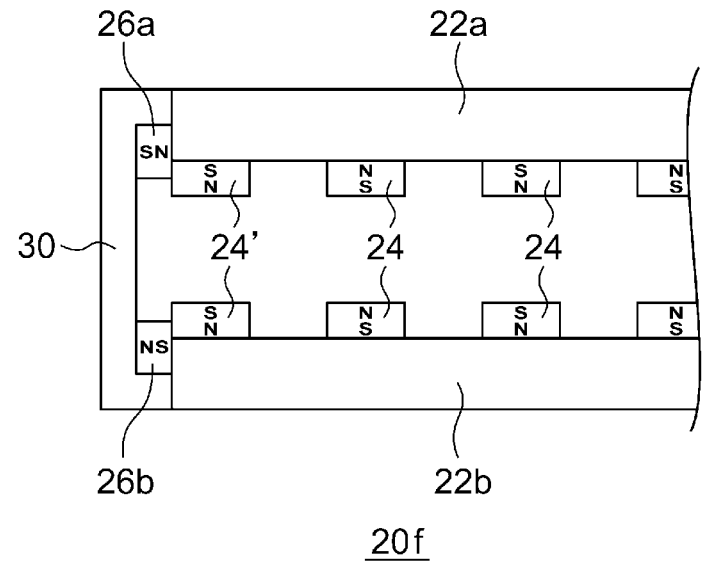
Figure 6A:
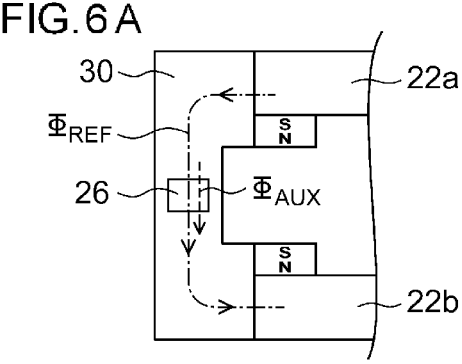
FIGS. 6A-6H are top view showing variations of the stator.
Figure 6B:
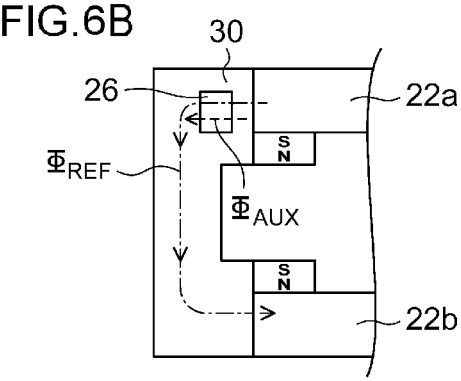
Figure 6C:
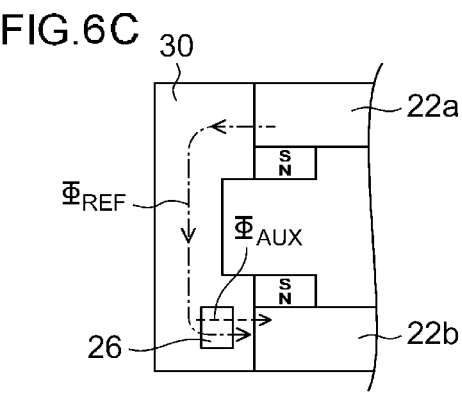
Figure 6D:
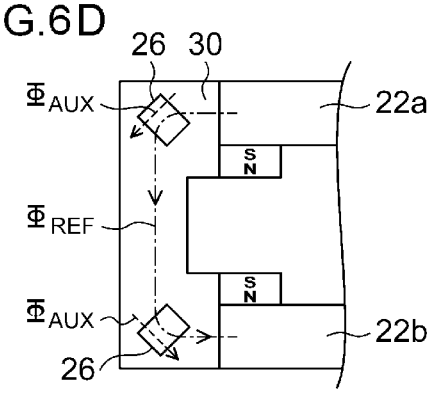
Figure 6E:
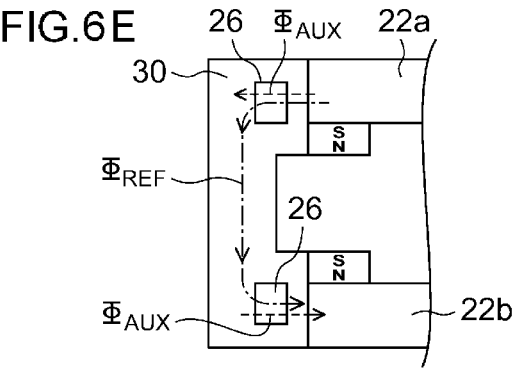
Figure 6F:
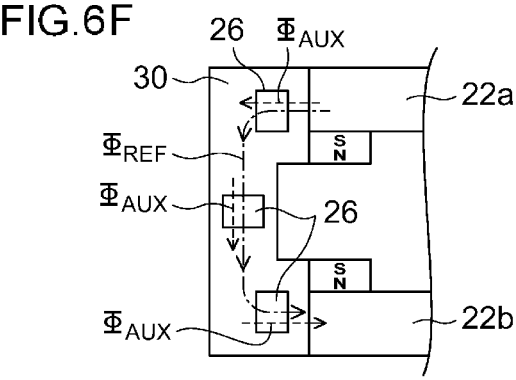
Figure 6G:
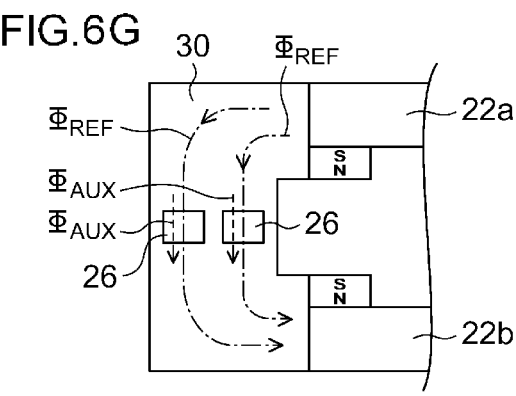
Figure 6H:
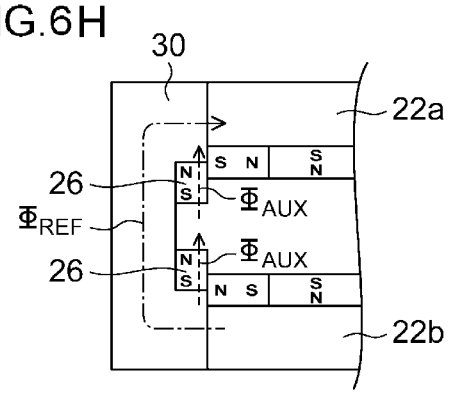

FIGS. 5A and 5B are top views showing variations of the stator 20. In a stator 20e of FIG. 5A, the arrangement of the magnet 24a of the main polarity orientation and the magnet 24b of the auxiliary polarity orientation is opposite to that of FIG. 2B. More specifically, the field magnet 24 at the extreme end is the magnet 24b of the auxiliary polarity orientation. The orientation of the auxiliary magnets 26a and 26b is perpendicular to the orientation of the auxiliary magnets 26a and 26b of FIG. 2A. In a stator 20f of FIG. 5B, only the field magnets 24 representing magnets of the main polarity orientation are arranged at intervals.

The same advantage as that of the linear motor 2 of FIGS. 2A and 2B can be obtained in these variations. Embodiments in which variation 1 and variation 2 are combined are also useful.

Variation 1.3

Described above are cases where two auxiliary magnets 26 are provided. The number of auxiliary magnets is not limited to two. At least one auxiliary magnet 26 may be provided. FIGS. 6A-6H are top view showing variations of the stator 20. As shown in these variations, any number of (e.g., one, two, three, . . . ) auxiliary magnets 26 may be provided. The auxiliary magnet 26 may be embedded in the magnetic member 30. The auxiliary magnets 26 in these variations are also arranged to generate the magnetic flux $\Phi_{AUX}$ in directions aligned with the target magnetic flux $\Phi_{REF}$. The following technical ideas are derived from the variations of FIGS. 6A-6G.

The magnetic member 30 includes the first portion parallel to the first direction (horizontal direction on the paper surface) and in contact with the end lateral surface of one 22a of the pair of back yokes, the second portion parallel to the first direction and in contact with the end lateral surface of the other 22b of the pair of back yokes, and the third portion connecting the first portion and the second portion. The cross section of the magnetic member 30 viewed in the third direction (direction perpendicular to the paper surface) perpendicular to the first and second directions is substantially U-shaped. At least one auxiliary magnet 26 is embedded inside the magnetic member 30.

As shown in FIGS. 5B, 5C, 5E, and 5F, one of the at least one auxiliary magnet is arranged inside the first portion or the second portion in an orientation in which the magnetic flux is generated in the first direction.

As shown in FIGS. 5A, 5F, and 5G, one of the at least one auxiliary magnet is arranged inside the third portion in an orientation in which the magnetic flux is generated in the second direction.

As shown in FIG. 5D, one of the at least one auxiliary magnet is arranged inside the corner of the magnetic member 30 in an orientation in which the magnetic flux is generated in a diagonal direction.

Variation 1.4

The embodiment described above is of moving coil type in which the coil is provided in the mover. However, the present invention is applicable to linear motors of fixed coil type in which the coil is provided in the stator. In this case, the back yokes 22a and 22b, the field magnets 24, the auxiliary magnets 26, and the magnetic member 30 form a mover.

Second Example

Figure 7:
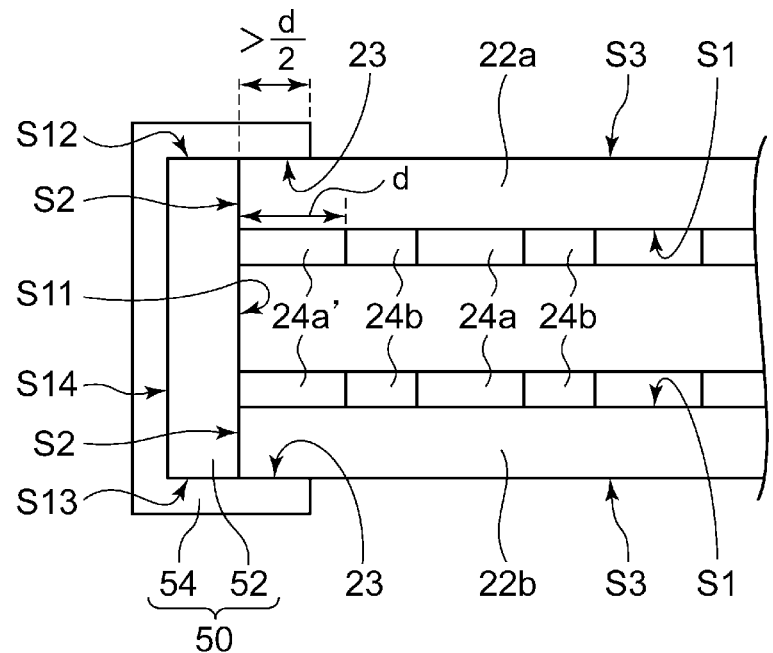
FIG. 7 is a top view of a stator according to the second example.

FIG. 7 is a top view of a stator 40 according to the second example. The stator 40 is provided with a yoke 22, a plurality of field magnets 24, and a magnetic member 50. The structure of the yoke 22 and the field magnets 24 are similar to those of the first example.

The magnetic member 50 magnetically couples the neighboring respective corresponding ends of the pair of back yokes 22a and 22b. Of the lateral surfaces of the pair of back yokes 22a and 22b, the magnetic member 50 is configured to cover at least the end lateral surface S2 and an end 23 of an outer lateral surface S3.

The magnetic member 50 of FIG. 7 is provided with a first portion 52 and a second portion 54. The first portion 52 is a cuboid block and has a first lateral surface S11 and a fourth lateral surface S14 opposite to each other, and a second lateral surface S12 and a third lateral surface S13 opposite to each other. At the respective ends of the first lateral surface S11, the first portion 52 is in contact with the end lateral surfaces S2 of the pair of back yokes 22a and 22b. The second lateral surface S12 of the first portion is substantially flush with the outer lateral surface S3 of one 22a of the pair of back yokes, and the third lateral surface S13 is substantially flush with the outer lateral surface S3 of the other 22b of the pair of back yokes.

The second portion 54 is U-shaped and has a recess that covers the second lateral surface S12, the third lateral surface S13, and the fourth lateral surface S14 of the first portion 52, and the ends 23 of the outer lateral surfaces of the pair of back yokes 22a and 22b.

Described above is the configuration of the stator 40.

Figure 8:
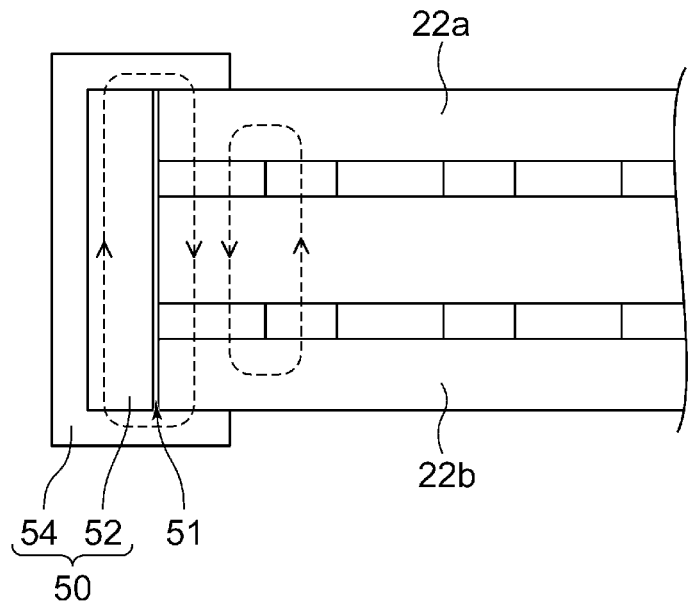
FIG. 8 shows the magnetic field in the stator of FIG. 7.

FIG. 8 shows the magnetic field in the stator 40 of FIG. 7. The magnetic field is indicated by broken lines. According to the stator 40, even if a gap 51 is created between the end lateral surfaces S2 of the back yokes 22a and 22b and the first lateral surface S11 of the first portion 52, the gap 51 is covered from outside by the second portion 54 of the magnetic member 50. Therefore, even if a leakage flux is generated from the gap 51 in an outward direction, the leakage flux is absorbed by the second portion 54 of the magnetic member 50 and is directly returned to the yoke 22. In this way, the stray magnetic field can be reduced in the yoke 22 as a whole.

A description will now be given of a variation of the linear motor according to the second example.

Variation 2.1

Figure 9A:
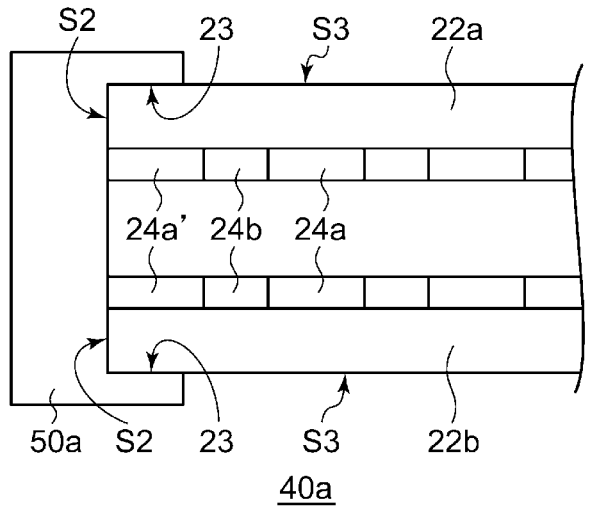
FIGS. 9A-9C are top views of variations of the stator.
Figure 9B:
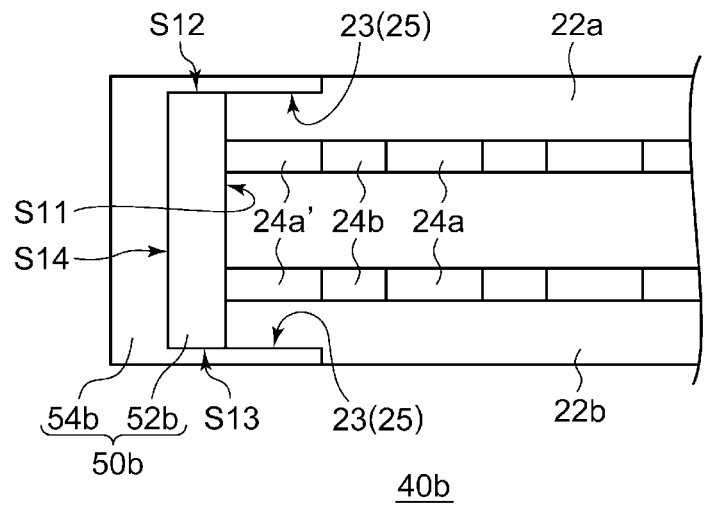
Figure 9C:
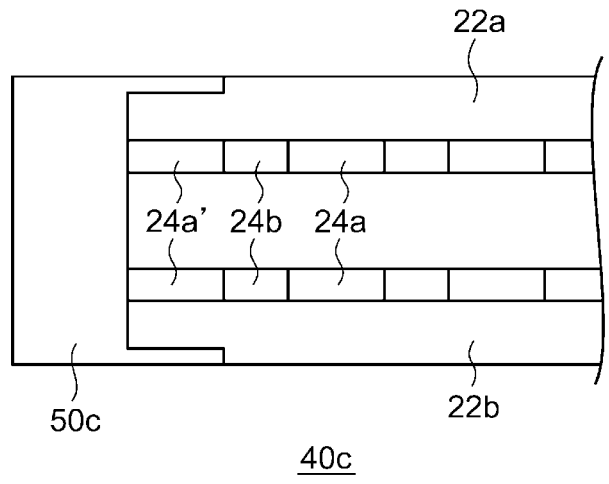

FIGS. 9A-9C are top views of variations of the stator 40a-40c. A magnetic member 50a of a stator 40a in FIG. 9A is formed such that the first portion 52 and the second portion 54 of FIG. 7 are formed so as to be integrated and inseparable. The magnetic member 50a covers the end lateral surface S2 and the end of the outer lateral surface S3 of each of the back yokes 22a and 22b.

Referring to FIG. 9B, the ends 23 of the outer lateral surfaces S3 of the back yokes 22a and 22b are formed with grooves 25a and 25b. The magnetic member 50b of the stator 40b is formed such that it can be fitted into the grooves 25a and 25b. More specifically, the second lateral surface S12 and the third lateral surface S13 of a first portion 52b are substantially flush with the bottom surfaces of the grooves 25a and 25b, respectively. A second portion 54b has a recess in contact with the bottom surface of the groove 25a, the second lateral surface S12 of the first portion 52b, the fourth lateral surface S14 of the first portion 52b, the third lateral surface S13 of the first portion 52b, and the bottom of the groove 25b.

By providing the grooves 25a and 25b, the outer lateral surfaces S3 of the back yokes 22a and 22b are flush with the lateral surfaces of the magnetic member 50b.

In the stator 40c of FIG. 9C, a magnetic member 50c is formed such that the first portion 52b and the second portion 54b of FIG. 9B are integrated and inseparable.

The variations described in the first example may be applied to the stator 40 according to the second example and the variations thereof. In other words, the arrangement of the field magnets 24 may be modified or the corners of the magnetic member may be rounded.

Third Example

The stator 40 according to the third example is a combination of the first example and the second example.

Figure 10:
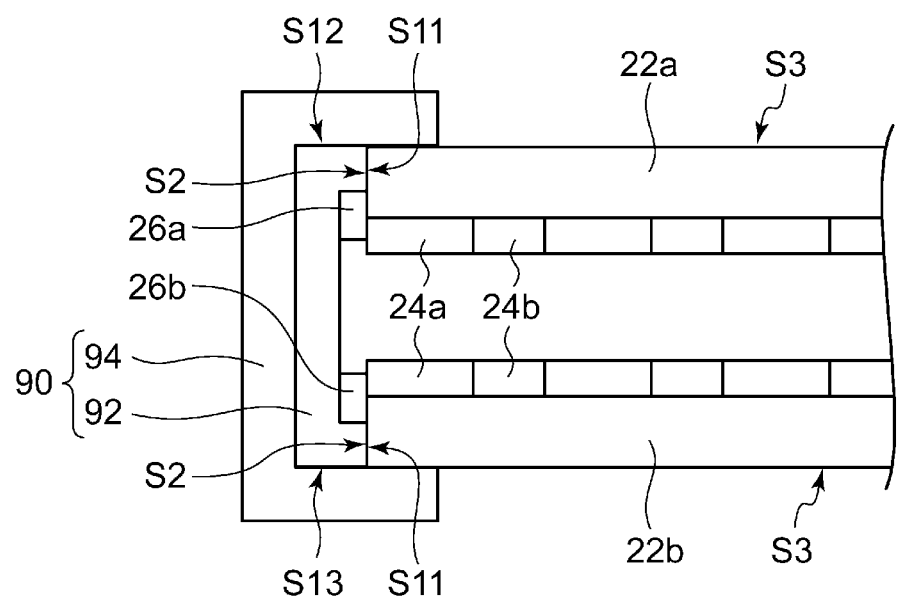
FIG. 10 is a top view showing a stator according to the third example.

FIG. 10 is a top view showing a stator 80 according to the third example. The stator 80 is provided with a pair of back yokes 22a and 22b, a plurality of field magnets 24, a pair of auxiliary magnets 26a and 26b, and a magnetic member 90.

Of the lateral surfaces of the back yokes 22a and 22b, the magnetic member 90 is configured to cover exposed portions of the end lateral surfaces S2 that are not covered by the auxiliary magnets 26a and 26b, and to cover the ends 23 of the outer lateral surfaces S3.

More specifically, the magnetic member 90 includes a first portion 92 and a second portion 94. The first portion 92 corresponds to the magnetic member 30 of the first example (FIGS. 2A and 2B) and the second portion 94 corresponds to the second portion 54 of the magnetic member 50 of the second example (FIG. 7).

The first portion 92 is contact with the end lateral surfaces S2 of the pair of back yokes 22a and 22b at the first lateral surface S11 of the first portion 92. The second lateral surface S12 of the first portion 92 is substantially flush with the outer lateral surface S3 of the one 22a of the back yokes, and the third lateral surface S13 is substantially flush with the outer lateral surface S3 of the other 22 of the back yokes.

The second portion 94 has a recess that covers the second lateral surface S12, the third lateral surface S13, and the fourth lateral surface S14 of the first portion 92, and the ends 23 of the outer lateral surfaces of the pair of back yokes 22a and 22b.

According to the third example, the stray magnetic field can be reduced by the auxiliary magnets 26 and the second portion 94 also helps reduce the stray magnetic field.

The variations described in the first and second examples can of course be applied to the stator 80 according to the third example, and such embodiments are also encompassed by the present invention. A description will be given of some such variations.

Variation 3.1

The first portion 92 may include a magnetic member in a hatched area shown in FIG. 4A sandwiched between the auxiliary magnets 26a and 26b.

The corners of the magnetic member 90 (second portion 94) may be rounded as shown in FIGS. 4A and 4B.

Variation 3.2

Still alternatively, the arrangement of the field magnets 24 may be modified as shown in FIGS. 5A and 5B.

Variation 3.3

Still alternatively, the first portion 92 and the second portion 94 may be integrated and inseparable as in the variation of FIG. 9A.

The ends 23 of the outer lateral surfaces S3 of the pair of back yokes 22a and 22b may be formed with grooves 25 so that the magnetic member 90 (second portion 94) is fitted into the grooves 25, as in the variation of FIG. 9B. In this case, the first portion 92 and the second portion 94 may be configured to be integrated and inseparable.

Variation 3.4

The number of auxiliary magnets 26 is not limited. As shown in FIGS. 6A-6H, the auxiliary magnet 26 may be embedded in the first portion 92, which corresponds to the magnetic member 30.

Described above is an explanation based on an exemplary embodiment. The embodiment is intended to be illustrative only and it will be obvious to those skilled in the art that various modifications to constituting elements and processes could be developed and that such modifications are also within the scope of the present invention.

The various linear motors described above can be used in many applications in which low stray magnetic field is required. Exemplary applications include actuators used in scanning electron microscopes. In an SEM, the stray magnetic field bends the orbit of electrons and so affects the precision of measurement significantly. Since the stray magnetic field in the above-described linear motors is small, the inventive linear motors can be suitably used in actuators inside an SEM (e.g., actuators for position control of the stage or position control of the beam source).

While the preferred embodiments of the present invention have been described using specific terms, such description is for illustrative purposes only, and it is to be understood that changes and variations may be made without departing from the spirit or scope of the appended claims.

What is claimed is:

1. A linear motor comprising:
   a mover, the mover being movable along a first axis;
   a stator;
   a pair of back yokes provided in one of either the mover or the stator, inner lateral surfaces of the back yokes opposing each other along a second axis perpendicular to the first axis, wherein the other of either the mover or the stator is sandwiched between the pair of back yokes;
   a plurality of field magnets arranged on the inner lateral surfaces of the back yokes, along the first axis;
   a magnetic member magnetically coupling the pair of back yokes endwise; and
   a plurality of auxiliary magnets each being provided either inside the magnetic member or in contact with the magnetic member, wherein
      one of said plurality of auxiliary magnets is disposed in contact with an end lateral surface of one of the pair of back yokes, and
      another of said plurality of auxiliary magnets is disposed in contact with an end lateral surface of the other of the pair of back yokes.

2. The linear motor according to claim 1, wherein:
   one of said plurality of auxiliary magnets is arranged in contact with both an end lateral surface of one of the pair of back yokes and with the field magnet at the extreme end provided along said one of the pair of back yokes; and
   another of said plurality of auxiliary magnets is arranged in contact with both an end lateral surface of the other of the pair of back yokes and with the field magnet at the extreme end provided along said other of the pair of back yokes.

3. The linear motor according to claim 1, wherein the auxiliary magnets are arranged so as to generate magnetic flux in a direction aligned with a target magnetic flux as assumed formed by the plurality of field magnets and the magnetic member.

4. The linear motor according to claim 1, wherein:
   the magnetic member includes a first portion parallel to the first axis and in contact with an end lateral surface of one of the pair of back yokes, a second portion parallel to the first axis and in contact with an end lateral surface of the other of the pair of back yokes, and a third portion parallel to the second axis and connecting the first portion and the second portion, and a cross section of the magnetic member viewed along a third axis perpendicular to the first and second axes is substantially U-shaped; and
   said plurality of auxiliary magnets is embedded inside the magnetic member.

5. The linear motor according to claim 4, wherein one of said plurality of auxiliary magnets is arranged inside the first portion or the second portion in an orientation in which the magnetic flux is generated along the first axis.

6. The linear motor according to claim 4, wherein one of said plurality of auxiliary magnets is arranged inside the third portion in an orientation in which the magnetic flux is generated along the second axis.

7. The linear motor according to claim 4, wherein one of said plurality of auxiliary magnets is arranged inside a corner of the magnetic member in an orientation in which the magnetic flux is generated in a diagonal direction.

8. A linear motor comprising:
   a mover, the mover being movable in a first direction;
   a stator;
   a pair of back yokes included in the stator, inner lateral surfaces of the back yokes opposing each other along a second axis perpendicular to the first axis, wherein the mover is sandwiched between the pair of back yokes;
   a plurality of field magnets arranged on the inner lateral surfaces of the back yokes, along the first axis;
   a magnetic member magnetically coupling neighboring respective corresponding ends of the back yokes and that is configured to cover at least an end lateral surface of each of the back yokes, perpendicular to the first axis, and a portion of an outer lateral surface of each of the back yokes.

9. The linear motor according to claim 8, wherein the magnetic member covers the outer lateral surface of each of the back yokes by a length at least ½ of the endmost field magnets' widthwise dimension along the first axis.

10. The linear motor according to claim 8, wherein the magnetic member includes:
    a first portion that is in contact with an end lateral surface of each of the back yokes at respective ends of a first lateral surface of the first portion, a second lateral surface of the first portion perpendicular to the first lateral surface being substantially flush with an outer lateral surface of one of the pair of back yokes, and a third lateral surface of the first portion opposite to the second lateral surface being substantially flush with an outer lateral surface of the other of the pair of back yokes; and
    a second portion that includes a recess that covers a second and third lateral surfaces of the first portion, a fourth lateral surface parallel to the first lateral surface of the first portion, and an end of an outer lateral surface of each of the back yokes.

11. The linear motor according to claim 10, wherein the first and second portions are formed so as to be integrated and inseparable.

12. The linear motor according to claim 10, wherein the first and second portions are formed so as to be discrete.

13. The linear motor according to claim 8, wherein an end of an outer lateral surface of each of the back yokes is formed with a groove, and the magnetic member is formed such that it can be fitted into the groove.

14. The linear motor according to claim 8, wherein corners of the magnetic member are rounded.

15. The linear motor according to claim 8, further comprising:
   one or more auxiliary magnets each being provided either inside the magnetic member or in contact with the magnetic member.

16. A linear motor comprising:
   a mover, the mover being movable along a first axis;
   a stator;
   a pair of back yokes provided in one of either the mover or the stator, inner lateral surfaces of the back yokes opposing each other along a second axis perpendicular to the first axis, wherein the other of either the mover or the stator is sandwiched between the pair of back yokes;
   a plurality of field magnets arranged on the inner lateral surfaces of the back yokes, along the first axis;
   a magnetic member magnetically coupling the pair of back yokes endwise; and
   one or more auxiliary magnets each being provided inside the magnetic member.

\* \* \* \* \*